United States Patent [19]

Hannover

[11] 4,036,514
[45] July 19, 1977

[54] PIPE FITTING
[75] Inventor: Finn Hannover, Wilmington, Del.
[73] Assignee: E. I. Du Pont de Nemours and Company, Wilmington, Del.
[21] Appl. No.: 517,225
[22] Filed: Oct. 23, 1974

Related U.S. Application Data

[63] Continuation-in-part of Ser. No. 265,993, June 26, 1972, abandoned, which is a continuation-in-part of Ser. No. 212,465, Dec. 27, 1971, abandoned.

[51] Int. Cl.² .............................................. F16L 41/00
[52] U.S. Cl. ...................................... 285/222; 29/447; 285/423; 285/DIG. 10
[58] Field of Search ....... 285/187, 423, 156, DIG. 10, 285/222, 382.4, 162; 16/2; 29/447; 85/37; 156/158, 296, 83–86; 264/230, 249

[56] References Cited

U.S. PATENT DOCUMENTS

| 2,706,134 | 4/1955 | Wilson et al. | 285/156 X |
| 2,966,373 | 12/1960 | Yount | 285/423 X |
| 2,994,933 | 8/1961 | Wolfe | 85/37 |
| 3,050,786 | 8/1962 | St. John et al. | 285/DIG. 10 |
| 3,320,106 | 5/1967 | Kirkpatrick et al. | 85/37 X |
| 3,382,121 | 5/1968 | Sherlock | 264/230 X |
| 3,406,988 | 10/1968 | Jones | 285/156 X |
| 3,526,683 | 9/1970 | Heslop et al. | 264/230 X |
| 3,758,916 | 9/1973 | Wetmore | 16/2 |

FOREIGN PATENT DOCUMENTS 648,887  8/1928  France ................................. 285/222

Primary Examiner—Dave W. Arola

[57] ABSTRACT

A pipe fitting of organic polymeric material such as polyethylene is provided wherein said pipe fitting is of unitary construction and includes a first tubular body portion of substantially uniform internal and external diameters integrally connected to a tapered heat-expandable tubular body portion having an external diameter at its terminal end less than the external diameter of the first tubular body portion. A method for making said pipe fitting also is provided which includes placing a tubular structure of organic polymeric material into a mold having a molding surface corresponding to that of said pipe fitting and cold-forming said tubular structure by pressing said tubular structure in said mold.

6 Claims, 10 Drawing Figures

PIPE FITTING

The present application is a continuation-in-part of application Ser. No. 265,993, filed on June 26, 1972, and now abondoned, which is, in turn, a continuation-in-part of application Ser. No. 212,465, filed on Dec. 27, 1971 (now abandoned).

The present invention relates to articles of manufacture of organic polymeric material and to a method of manufacture therefor. More particularly, the present invention is directed to pipe fittings of organic polymeric material and to a method of manufacture for making such pipe fittings.

Shaped structures such as pipe fittings of organic polymeric material such as polyethylene have become widely known and used for diverse purpose such as for conveying fluids. Piping systems of organic polymeric material have been found to be desirable especially in view of the ease with which such systems may be fabricated. For example, pipe fittings and pipe may easily be assembled together by utilizing chemical solvents, adhesives or heating treatments for joining these pieces, e.g., polyethylene pipe fittings may be joined to polyethylene pipe by heating the fitting and the pipe before assembly to melt the polyethylene at the region or surface of each piece to be contacted followed by mating the heated surfaces of each piece and cooling the heated pieces whereby to effect fusing of the polyethylene to provide a structure of integral or unitary construction.

Pipe fittings of organic material are ordinarily prepared by molding techniques. U.S. Pat. No. 3,312,765 disclosed a method for making molded polyethylene pipe fittings such as, for example, T-fittings by cutting sections of a polyethylene pipe in such a manner as to fit together to form a preform having substantially the configuration of the desired fitting, e.g., a T-fitting, and placing the fitted preform in a mold having the configuration of the desired fitting and subjecting the preform in the mold to a molding pressure of at least about 2000 psi. at a temperature of at least 280° F. for a time sufficient to fuse the sections of the pipe together. The resulting molded fitting may then be secured to a polyethylene piping system by fusing each branch of the fitting to appropriate sections of polyethylene pipe. Such fittings and assembly techniques are satisfactory when assembling fittings and pipe in open and unrestricted areas, but present a major drawback and disadvantage when fittings and pipe are to be assembled in confined or severely restricted spaces such as when relining sewer pipe.

Existing sewer mains of, for example, concrete, clay or cast iron pipe often become unserviceable because a pipe section either decays or is physically damage as by breaking due to dynamic earth stresses acting thereon. Rehabilitating unserviceable sewers by replacing defective sewer components in extermely difficult and expensive. These drawbacks can be avoided by lining existing sewer mains with polyethylene pipe. This is easily accomplished by effecting only a few excavations at widely spaced points along a sewer main and penetrating the main at these points and inserting thereinto a continous length of polyethylene pipe. These lengths of polyethylene pipe may be joined together at their respective ends by conventional fusing techniques to provide a continuous pipe encompassed within the existing sewer main.

A very difficult problem is presented when branch lines such as service lines have to be connected to the relined sewer main. Presently, this necessitiates making an excavation all the way to the sewer main in the vicinity of the service line and removing feet of the old sewer main to expose the polyethlene pipe therein. A saddle fixture is then secured to the exposed portion of the polyethylene pipe and the service line is secured to the branch which extends from the saddle fixture. Accordingly, a principal object of the present invention is to provide a new pipe fitting adapted to be connected to a polymeric pipe within an existing sewer main through an existing branch line thereby obviating the need for excavating to the sewer main in the vicinity of the branch line connection therewith.

According to the present invention there is provided an article of manufacture comprising a pipe fitting of organic polymeric material and of unitary construction having a first tubular body portion of substantially uniform internal and external diameters integrally connected to a heat-expandable tubular body portion. The heat-expandable tubular body portion of the fitting is preferably characterized by an external diameter at its terminus which is less than the external diameter of said first tubular body portion.

According to the present invention there is further provided a method of manufacture for making a heat-expandable pipe fitting of organic polymeric material which comprises placing a tubular structure of said polymeric material into a mold having a molding surface corresponding to the external surface of the pipe fitting described immediately hereinabove and cold-forming said tubular structure by advancing and pressing said tubular structure in said mold. In a more specific embodiment, the method of the invention comprises placing a tubular structure of organic polymeric material of substantially uniform internal and external diameters into a mold comprising a first tubular mold section having a substantially uniform internal diameter greater than the external diameter of said tubular structure, a second tubular mold section of substantially uniform internal diameter smaller than the internal diameter of said first tubular mold section, and a tapered mold section interconnecting said first and second tubular mold sections to provide a unitary mold including a tapered tubular transition having an internal diameter at one end substantially equal to the internal diameter of said first tubular mold section and an internal diameter at the other end substantially equal to the internal diameter of said second tubular mold section, and cold-forming said tubular structure in said mold by advancing one end of said tubular structure from said first tubular mold section into said tapered mold section and towards said second tubular mold section. The cold-forming of the tubular structure is conducted at a temperature below the fabrication temperature of the organic polymeric material.

The nature and advantages of the invention will be more clearly understood by the following description and the several views illustrated in the accompanying drawings wherein like reference characters refer to the same parts throughout the several views and in which.

Figure 1:
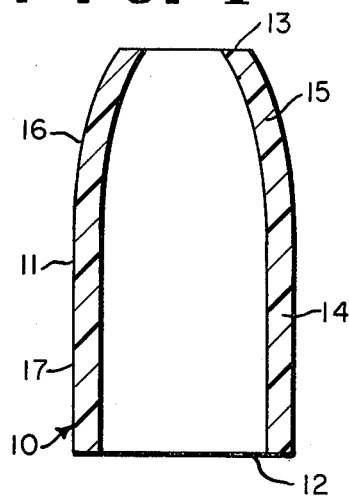
FIGS. 1 and 2 are cross-sectional views of different embodiments of the pipe fitting of the invention.

Referring to FIG. 1, the pipe fitting 10 therein disclosed in illustration of the invention is of unitary constructin and comprises a substantially tubular body 11 having a substantially uniform wall thickness between ends 12 and 13 therof. Tubular body 11 of pipe fitting 10 is characterized by a body portion 14 of substantially uniform internal and external diameters integrally connected to a tapered body portion 15. Tapered body portion 15 of tubular body 11 is characterized by a smooth and substantially uniform outer surface 16 which tapers gradually inwardly or in a decreasing manner from its point of intersection with external or outer surface 17 of body portion 14 of tubular body 11. As is shown in FIG. 1, the external diameter of body portion 15 decreases gradually from that corresponding to the external diameter of body portion 14 to that at end 13 of pipe fitting 10. The terminal end 13 of pipe fitting 10 is characterized by an external diameter which is less than the external diameter of body portion 14 of the pipe fitting.

Figure 2:
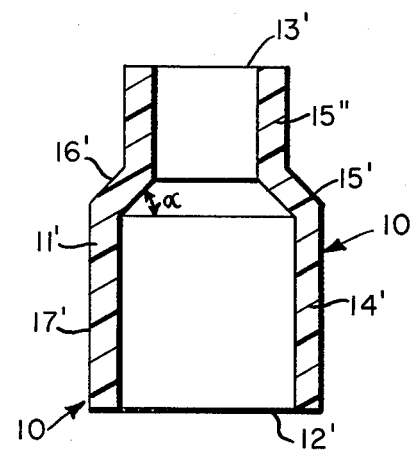

Another embodiment of the pipe fitting of the present invention is shown in FIG. 2. The pipe fitting 10 shown in FIG. 2 comprises a tubular body 11' of substantially uniform wall thickness between ends 12' and 13' thereof. Tubular body 11' of pipe fitting 10 is characterized by a body portion 14' of substantially uniform internal and external diameters integrally connected to a tapered body portion 15'. Tapered body portion 15' is characterized by a substantially uniformly tapered outer surface 16' which tapers uniformly inwardly from its point of intersection with the external or outer surface 17' of body portion 14' of tubular body 11'. The amount of taper provided in tapered body portion 15' is represented by the angle $\alpha$ in FIG. 2: the angle $\alpha$ must be less than 90° and is preferably about 45°. As is shown in FIG. 2, the external diameter of body portion 15' decreases uniformly from that corresponding to the external diameter of body portion 14' to that of tubular extension 15'' integrally secured to the end of tapered body portion 15'. Tubular extension 15'' may be either tapered or substantially tubular as shown in FIG. 2, and in either case the terminal end 13' of pipe fitting 10 is characterized by an external diameter which is less than the external diameter of body portion 14' of the pipe fitting.

Figure 4:
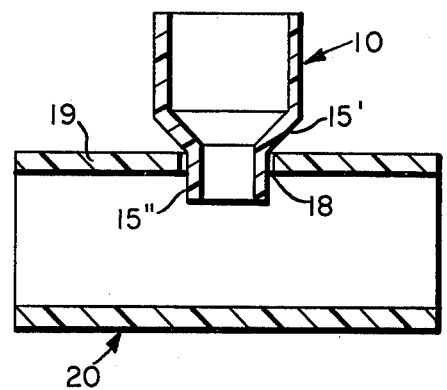
Figure 5:
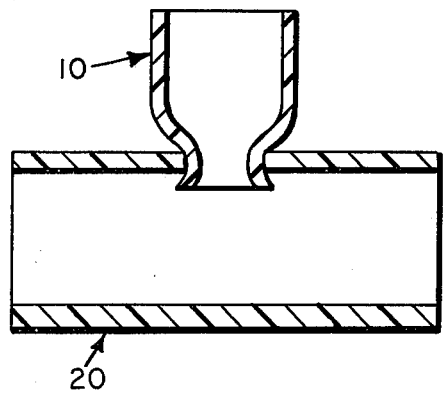
FIG. 5 is a cross-sectional view showing the relationship of the pipe fitting and pipe of FIG. 4 after engagement.

A salient feature of the pipe fitting of the invention is that it possesses heat expandability properties so that the pipe fitting may be incorporated into a piping system by applying only heat thereto at a suitable temperature below the melting point of the polymeric material thereof. For instance, in the case of a pipe fitting of polyethylene, such as pipe fitting 10 depicted in FIGS. 1 and 2, the end 13 or 13' of the fitting may be inserted into an aperture or opening of appropriate dimension in the wall of a pipe or tubing, and when the pipe fitting is heated by any suitable means the tapered body portion thereof will expand and mechanically interlock with the pipe or tubing. The foregoing is illustrated in FIGS. 3, 4 and 5.

Figure 3:
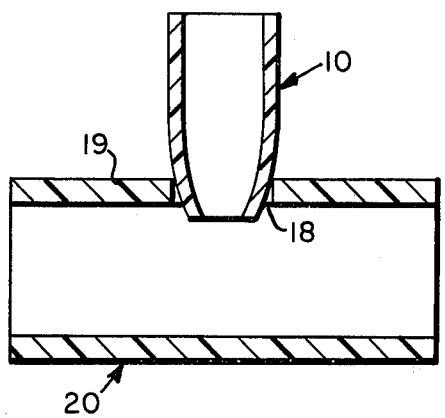
FIGS. 3 and 4 are cross-sectional views showing in greater detail the relationship of the fittings of FIGS. 1 and 2, respectively, to a pipe structure before connection therewith.

Referring to FIG. 3, pipe fitting 10 may be inserted into opening 18 in the wall 19 of pipe 20. Thereafter, the tapered body portion of pipe fitting 10 is heated. More specifically, if polyethlene is used the pipe fitting may be heated to a temperature below the crystalline melting point of the polyethylene of pipe fitting 10 by any suitable means, e.g., about 110° C. This may be accomplished by inserting a heating device such as a tapered metal bock having a resistance heating element of sufficient heating capacity, e.g., 500 watts, embedded therein to heat the tapered body portion of pipe fitting 10. When heated sufficiently, the tapered heat-expandable body portion of pipe fitting 10 expands and presses firmly against the edge of opening 18 in pipe 20 to interlock mechanically with pipe 10. Referring to FIG. 4, the tapered body portion 15' and the tubular extension 15'' when heated sufficiently expands and presses firmly against the edge of opening 18 in pipe 20 to securely engage pipe 20 to become firmly interlocked therewith in a manner as shown in FIG. 5. To illustrate the practice of the invention, a cold-formed heat-expandable pipe fitting made from Aldyl® brand pipe, having a tubular body portion of 4½ inches external diameter and a tapered heat-expandable tubular body portion of 3¾ inches external diameter, was satisfactorily assembled with or to an 8 inch external diameter Aldyl® pipe by first drilling a circular opening of 3β inches diameter through the wall of the Aldyl® pipe and inserting thereinto the tapered, heat-expandable tubular body portion of the pipe fitting until the pipe fitting fully occupied the opening in the pipe. Thereafer, a heating element was inserted into the pipe fitting and activated for about 15 minutes to heat the tapered tubular portion of the fitting to a temperature of about 110° C. At the end of the heating cycle the tapered tubular portion of the pipe structure by being firmly interlocked therewith through the circular opening in the wall thereof; the outside diameter of the section of the tapered tubular portion of the pipe fitting which extends into the Aldyl® pipe was found to be about 4.05 inches. Thus, the tapered tubular portion of the pipe fitting had expanded at its end from a diameter 33¾ inches to a diameter of 4.05 inches or about 8%. The engagement of the pipe fitting and the pipe was as shown in FIG. 5.

Figure 6:
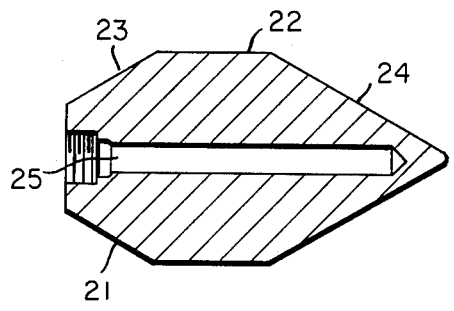
FIG. 6 is a cross-sectional view of a heater device useful for heating the heat-expandable pipe fitting of the present invention.
Figure 6A:
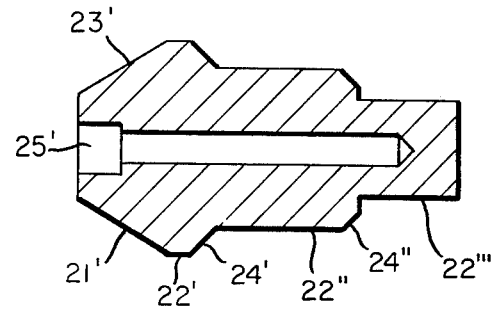

A suitable heating device for heating the tapered tubular portion of the pipe fitting of the invention is shown in FIGS. 6 and 6a. The heating device shown in FIG. 6 comprises a body 21 of heat-conducting material, preferably metal, having a cylindrical section 22 and tapered sections 23 and 24 integrally connected to section 22. The body 21 of the heating device is provided with a centrally located bore 25 which is adapted to accommodate a suitable heating element such as a resistance or induction heating probe of sufficient heating capacity to heat the mass of body 21 which in turn inparts heat to the tapered tubular portion of the pipe fitting when operatively inserted therein. The body 21 of the heating device is preferably secured at the end of a suitable extension (not shown) which also may enclose conductors as may be necessary for connecting the heating element in body 21 to a suitable external source of energy. The embodiment of the heating device shown in FIG. 6a has a somewhat different profile from that shown in FIG. 6 and comprises a body 21' and a plurality of cylindrical sections 22', 22'' and 22''', integrally connected as shown by tapered sections 24' and 24". The heating device of FIG. 6a also has a central bore 25' and tapered section 23' and is utilized in the same manner as that of FIG. 6 described above.

Figure 7:
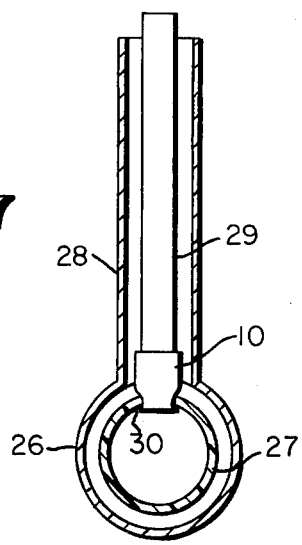
FIG. 7 is a schematic view in cross-section showing a re-lined sewer main and a service line connected thereto by means of a pipe fitting of the present invention.

The pipe fitting of the present invention may be utilized for connecting service lines to relined sewer mains. To illustrate, FIG. 7 shows an old sewer main 26 which has been relined with a polyethylene pipe 27. Numeral designation 28 identifies a service line connected to the old sewer main 26. By means of the present invention, a new service line 29 of organic polymeric material, e.g., polyethylene, may be connected to pipe 27 without having to excavate from the ground surface to sewer main 26 and removing portions of the old sewer main 26 to gain access to pipe 27 therein. This may be accomplished by excavating a shallow opening to expose service line 28 near the ground surface. Service line 28 is thereafter penertrated by removing a portion thereof and a remotely operable hole saw is inserted into service line 28, and utilized for cutting an opening (preferably circular) through the wall of pipe 27 in old sewer main 26. New service line 29 having a heat-expandable pipe fitting 10 integrally secured at one end thereof is inserted into old service line 28 and advanced therein sufficiently so that the tapered, heat-expandable tubular portion of pipe fitting 10 penetrates into and through the opening 30 in the wall of pipe 27. Thereafter, a heating device such as that depicted in FIGS. 6 or 6a is inserted into new service line 29 and is advanced through the service line so that it becomes positioned in the tapered tubular portion of pipe fitting 10. The heating device is then energized to heat the tapered portion of pipe fitting 10 so that it is caused to expand and tightly engage the opening 30 in pipe 27 in the manner as described hereinabove. A heating cycle of about 15 minutes has been found to be sufficient to adequately engage pipe fitting 10 and pipe 27. The heater device is thereafter removed and new service line 29 may be connected at its other end to the remainder of the service line branch to complete the sewer connection.

Figure 8:
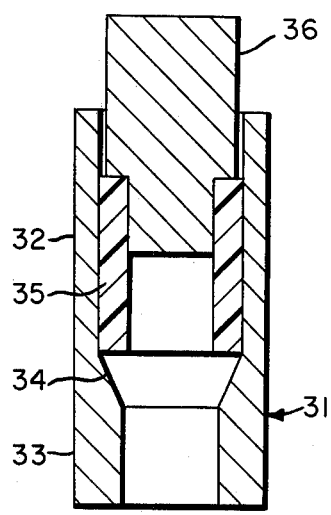
FIGS. 8 and 9 are cross-sectinal views illustrating a mold and the cold-forming of the pipe fitting of the present invention.
Figure 9:
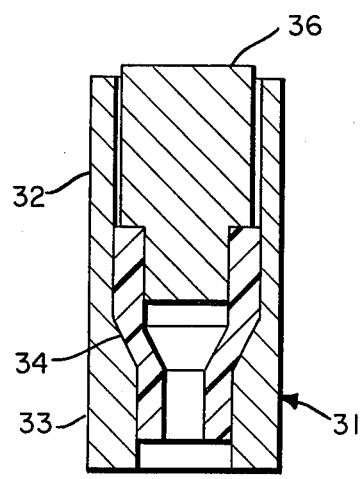

Pipe fitting of the present invention may be provided by cold-forming a pipe structure. This may be accomplished by placing a tubular structure, e.g., pipe, of sufficient length into a cold-forming mold such as shown in FIGS. 8 and 9, and pressing or advancing one end of the tublar structure into the mold so that the end of the tubular structure inserted foremost into the mold is made to assume the configuration of the mold. Referring to FIG. 8, a suitable mold is shown at 31 comprising a first tubular mold section 32 having substantially uniform internal and external diameters and a second tubular mold section 33 integrally connected to the first tubular mold section 32 by means of tapered mold section 34. The tapered mold section 34 provides a transition section having an internal diameter at one end substantially equal to the internal diameter of tubular mold section 32 and an internal diameter at the other end substantially equal to the internal diameter of tubular mold section 33. In practicing the process or method of the invention, a tubular structure 35 of organic polymeric material, e.g., polyethylene, having a diameter slightly less than the internal diameter of tubular mold section 32 is inserted into tubular mold section 32. The tubular structure 35 is pressed or advanced into mold 31 so that the foremost end of tubular structure 35 is deformed and made to assume on its external surface the configuration of the internal surface of mold 31 such as shown in FIG. 9. The cold-forming of tubular structure 35 is preferably accomplished by utilizing press plug 36 which is a cylindrical form having an end section adapted to fit into the interior of tubular structure 35 which terminates at a shoulder adapted to rest upon the wall of tubular structure 35 so that pressure applied downwardly to press plug 36 is uniformly distributed to tubular body 35 for advancing tubular body 35 into mold 31. The tubular structure 35 may be heated to any suitable temperature below its fabricated temperature which in the case of polyethylene may be below the crystalline melting point thereof; preferably, the tubular sturcture is heated to about 100° C., before being cold-formed. The fabrication temperatures of representative organic polymeric materials are disclosed on pages 739–740 of Lang's Handbook of Chemistry, Seventh Edition, September, 1949. The molded tubular structure also is preferably cooled before it is removed from mold 31. For instance, water may be circulated through the molded tubular structure or the entire assembly of mold and tubular structure therewithin may be immersed in a water bath before removing the molded tubular structure from mold 31. The cold-formed tubular structure has the configuration shown in FIG. 2. Satisfactory results have been obtained by cold-forming suitable lengths of Aldyl® A brand of polyethylene pipe of 4-inch IPS and 4.5 inches external diameter by heating the pipe specimens to between about 90° C. and about 100° C. and inserting the heated pipe into a mold having a tubular mold section corresponding to that of 33 in FIGS. 8 and 9 of 3¼ inches diameter, followed by applying a molding force of 6 tons and maintaining the molding pressure on the pipe specimen for about 1 minute after molding. After removing the molded pipe fitting from the mold there is some recovery or "snap back" such that the final diameter of the tubular section corresponding to that of 15 inches in FIG. 2 is between about 3½ and about 3¾ inches.

In accordance with the method described above, the heat-expandable pipe fittings of the organic polymeric materials indicated in Table 1 below were prepared; in each case listed in Table 1 the fitting preform was 4 inches IPS pipe having a length of 8 inches which was cold-formed in a mold (as in FIGS. 8 and 9) using a press ram (plug 36 in FIGS. 8 and 9) speed of 12 inches per minute and a ram hold time in the mold of 15 seconds after cold-forming, and each cold-formed fitting was cooled for 3 minutes in a bath of ice-water immediately after cold-forming; the expandability of each cold-formed fitting was evaluated by immersing samples of the fitting in boiling water for 15 minutes and in a heated air furnace a 140° C. for 1 hour after which the minimum diameter of the expandable portion of the fitting was measured at room temperature.

TABLE 1

| Sample | Polymer | Nominal Wall Thickness, In. | Preform Temperature ° C. | Nominal Preform Diameter, In. | Minimum Fitting Diameter After Cold-Forming, In. | Minimum Fitting Diameter After Testing[9] | |
|---|---|---|---|---|---|---|---|
| | | | | | | Boiling Water | 140° C. Air |
| A | Aldyl® | 0.405 | 100° C. | 4.5 | 3.484 | 4.105 | — |
| B | Aldyl®[1] | 0.405 | 100° C. | 4.5 | 3.633 | 4.232 | 4.280 |

TABLE 1-continued

| Sample | Polymer | Nominal Wall Thickness, In. | Preform Temperature °C. | Nominal Preform Diameter, In. | Minimum Fitting Diameter After Cold-Forming, In. | Minimum Fitting Diameter After Testing9 | |
|---|---|---|---|---|---|---|---|
| | | | | | | Boiling Water | 140° C. Air |
| C | Polypropylene[2] | 0.377 | 100° C. | 4.5 | 3.430 | 3.993 | 4.0708 |
| D | CPVC[3] | 0.377 | 100° C. | 4.5 | 3.360 | 3.385 | 4.485 |
| E | PVC[4] | 0.375 | 80° C. | 4.5 | 3.355 | 4.405 | 4.4658 |
| F | ABS[5] | 0.265 | 100° C. | 4.5 | 3.335 | 3.975 | 4.4708 |
| G | Delrin®[6] | 0.130 | 100° C. | 4.5 | 3.580 | 3.833 | 3.930 |
| H | Acrylic[7] | 0.250 | 120° C. | 4.5 | 3.357 | 3.370 | 4.400 |

[1]Adyl® A brand pipe irradiated to a dosage level of 20-30 M rad.
[2]Manufactured by Cabot Corporation
[3]Chlorinated polyvinyl chloride pipe manufactured by Harvel Plastics, Inc.
[4]Polyvinyl chloride pipe manufactured by Harvel Plastics, Inc.
[5]Acrylonitrile-butadiene-styrene pipe manufactured by Yardley Products, Inc.
[6]Polyoxymethylene pipe manufactured by E. I. du Pont de Nemours and Company
[7]Methyl methacrylate pipe manufactured by A. L. Hyde Co.
[8]Heated Air was at 120° C.
[9]Measurements were made at room temperature The elastic memory of the pipe fitting of the invention is aptly illustrated by the foregoing data and that presented next herebelow. A cold-formed fitting of polyethylene having the configuration of the fitting of FIG. 2, a length of tubular body 14' of 6½ inches, a length of tubular body portion 15" of 2½ inches interconnected by a tapered body portion 15' having a longitudinal length of 1 inch to provide an overall fitting length of 10 inches was severed radially at its longitudinal mid-point to provide two separate halves. Reference marks were made on the circumference of tubular body portion 15" at a distance of 1 inch ($A_1$) and a distance of 2 inches ($A_2$) from the terminal end 13'. Reference marks also were made on the circumference of tubular body portion 14' at a distance of 2 inches ($B_2$) and a distance of 3 inches ($B_3$) from the terminal end 12' of the fitting. The external diameter of the pipe fitting was measured at locations $A_1$, $A_2$, $B_2$ and $B_3$ at 23° C. and the results are recorded in column 1 of Table 2 below. Next, both halves of the pipe fitting were placed in an air oven maintained at a temperature of 110° C. After being exposed to this temperature for a period of 1 hour, the external diameter of the pipe fitting at locations $A_1$, $A_2$, $B_2$ and $B_3$ was measured and the results are recorded in column 2 of Table 2 below. Thereafter, both halves of the pipe fitting were allowed to cool to room temperature. The external diameter of the pipe fitting at locations $A_1$, $A_2$, $B_2$ and $B_3$ was measured at room temperature and the results are recorded in column 3 of Table 2 below.

TABLE 2

| Reference Location | Diameter, Inches | | |
|---|---|---|---|
| | Column 1 At 23° C. | Column 2 At 110° C. | Column 3 At 23° C. |
| $A_1$ | 3.646 | 4.330 | 4.187 |
| $A_2$ | 3.644 | 4.330 | 4.188 |
| $B_2$ | 4.496 | 4.575 | 4.490 |
| $B_3$ | 4.493 | 4.580 | 4.483 |

The foregoing data shows that tubular portion 14' of the pipe fitting expands an average of about 0.083 inch when heated from 23° C. to 110° C. This is an expansion of about 2% and corresponds to a thermal coefficient of expansion of $21 \times 10^{-5}$ ° C. which is the characteristic expansion in this temperature range of medium density polyethylene. The data in column 3 of Table 2 shows that the expansion is reversible when tubular portion 14' of the pipe fitting is cooled to the original temperature of 23° C.

In direct contrast, tubular body portion 15" of the pipe fitting exhibits permanent deformation after heating, i.e., the expansion of tubular body portion 15" is irreversible. The permanent expansion of portion 15" of the pipe fitting is about 0.550 inch or 15%.

What is claimed is:

1. An article of manufacture comprising a tubular pipe fitting of unitary construction of solid organic polymeric material throughout, said solid organic polymeric material having the property, after being cold formed, of being permanently and irreversibly heat-expandable, said tubular pipe fitting for connecting a branch pipe to a main pipe of larger diameter than said branch pipe, sad tubular pipe fitting having a first and second tubular body portion, only said second tubular body portion being cold formed, said first tubular body portion being of substantially uniform internal and external diameters, adapted to be bonded at one end to said branch pipe, and integrally connected at its other end to said second cold-formed and heat-expandable tubular body portion having an internal and external diameter at its terminus which is less than the external diameter of said first tubular body portion and which is adapted to be inserted into an opening in said main pipe and, upon heating, expand permanently and irreversibly to increase the internal and the external terminus diameters; to directly tightly engage said opening and firmly interlock with said main pipe.

2. The article of claim 1 wherein said organic polymeric material is polyethylene.

3. The article of claim 1 wherein said organic polymeric material is polyvinyl chloride.

4. The article of claim 1 wherein said second tubular body portion is integrally connected to said first tubular body portion by means of a tapered body portion.

5. The article of claim 4 wherein said organic polymeric material is polyethylene.

6. The article of claim 4 wherein said organic polymeric material is polyvinyl chloride.

* * * * *